United States Patent [19]

Deutzer

[11] Patent Number: 5,351,794
[45] Date of Patent: Oct. 4, 1994

[54] CURRENT COLLECTOR HOLDER FOR A CARBON SHOE

[76] Inventor: Manfred Deutzer, Franz-Stenzer-Str. 3, D-1140 Berlin, Fed. Rep. of Germany

[21] Appl. No.: 30,455

[22] PCT Filed: Oct. 4, 1991

[86] PCT No.: PCT/DE91/00794

§ 371 Date: Apr. 1, 1993

§ 102(e) Date: Apr. 1, 1993

[87] PCT Pub. No.: WO92/05975

PCT Pub. Date: Apr. 16, 1992

[30] Foreign Application Priority Data

Oct. 4, 1990 [DE] Fed. Rep. of Germany ....... 4031686
Nov. 9, 1990 [DE] Fed. Rep. of Germany ....... 4036137

[51] Int. Cl.$^5$ ............................................. B60L 5/08
[52] U.S. Cl. ........................................ 191/55; 191/59.1
[58] Field of Search ............... 191/45 R, 47, 49, 54, 191/55, 59.1, 60.5

[56] References Cited

U.S. PATENT DOCUMENTS

| | | | |
|---|---|---|---|
| 2,221,611 | 11/1940 | Schaake | 191/55 |
| 2,229,810 | 1/1941 | Leuchs | 191/55 |
| 2,305,297 | 12/1942 | Leuchs | 191/55 |
| 2,388,123 | 10/1945 | Conradty | 191/54 X |

FOREIGN PATENT DOCUMENTS

| | | | |
|---|---|---|---|
| 111300 | 6/1928 | Austria | 191/55 |
| 209376 | 11/1959 | Austria . | |
| 342117 | 3/1978 | Austria . | |
| 0462909 | 12/1991 | European Pat. Off. | 191/47 |
| 466423 | 10/1928 | Fed. Rep. of Germany | 191/55 |
| 682921 | 10/1939 | Fed. Rep. of Germany | 191/55 |
| 694376 | 7/1940 | Fed. Rep. of Germany | 191/55 |
| 727830 | 11/1942 | Fed. Rep. of Germany | 191/59.1 |
| 752289 | 9/1952 | Fed. Rep. of Germany | 191/59.1 |
| 1011457 | 7/1957 | Fed. Rep. of Germany . | |
| 2138459 | 2/1973 | Fed. Rep. of Germany | 191/59.1 |
| 2461311 | 7/1976 | Fed. Rep. of Germany . | |
| 159163 | 2/1983 | Fed. Rep. of Germany . | |
| 505375 | 12/1954 | Italy | 191/55 |
| 721408 | 1/1955 | United Kingdom | 191/55 |

*Primary Examiner*—Michael S. Huppert
*Assistant Examiner*—Scott L. Lowe
*Attorney, Agent, or Firm*—Mark P. Stone

[57] ABSTRACT

A current collector holder for a carbon shoe, which bears against a contact wire, for electrically driven vehicles, has two first webs which grip a foot region of the shoe, and two second webs which project away from the shoe are arranged underneath the shoe. An independent spring system is provided for exerting forces against the second webs for pressing the first webs against the foot region of the shoe. The spring system has a spring which extends uniformly in the longitudinal direction of the shoe, and bears with its longitudinal regions against the second webs to transmit a spring force, acting in a direction transverse to the shoe, to the second webs. The holder is simple to construct and provides contact forces acting continuously over the entire length of the shoe.

19 Claims, 7 Drawing Sheets

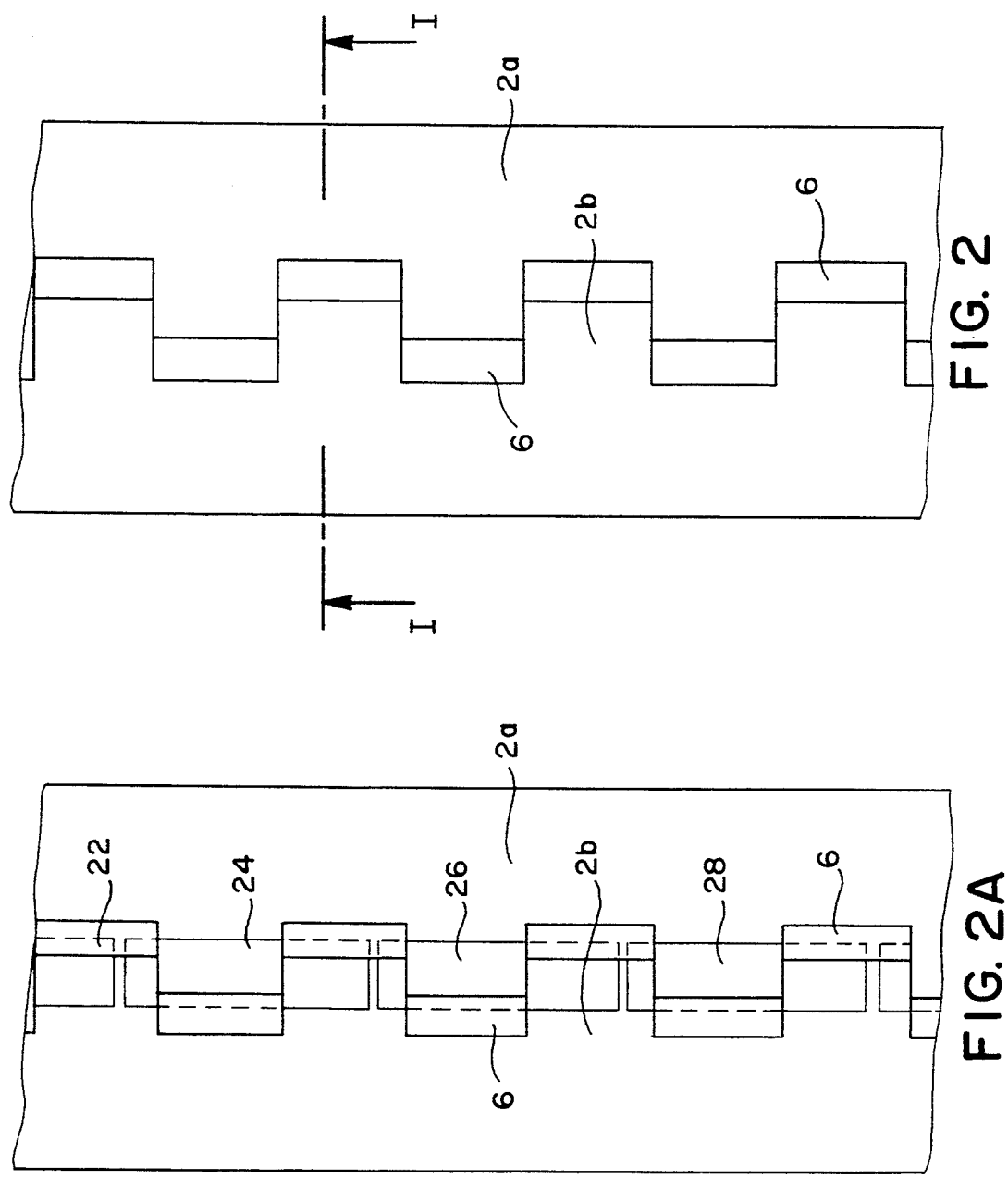

CURRENT COLLECTOR HOLDER FOR A CARBON SHOE

BACKGROUND OF THE INVENTION

The invention relates to a current collector holder for a carbon shoe, which bears against a contact wire, for electrically driven vehicles, which holder has two first webs, which grip the foot region of the shoe, and two second webs, which project away from the shoe and are arranged underneath it, a separate spring system being provided which presses the second webs relatively towards one another and hence presses the first webs against the foot region of the shoe.

As a rule, the holder is connected to the current collector via side elements, so-called horns.

In the case of a known holder of this type (DD-PS 159,163), the spring system is formed by a plurality of spiral springs which act on the second webs at discrete points on the second webs, oriented transversely with respect to the longitudinal direction of the shoe. This construction is relatively complicated and its mass is very high. In addition, the forces do not act continuously over the entire length of the second webs, as a result of which stresses are caused in the carbon shoe. At the same time, the contact voltage drop between the carbon shoe and the holder is relatively high.

SUMMARY OF THE INVENTION

The invention is based on the object of constructing the holder mentioned initially in such a manner that it is simpler than that known and in such a manner that the spring forces act continuously over the entire length of the shoe.

This construction is achieved according to the invention in that a spring is provided as the spring system, which spring extends unchanged in the longitudinal direction of the shoe, bears against the second webs with longitudinal regions, and in this way transmits its spring force, which acts in the transverse direction of the shoe, to the second webs.

This construction is distinguished by simplicity. This has a favorable effect on production and allows the use of worn carbon shoes in a simple manner. In addition, the spring acts continuously over the entire length of the second webs. This leads to it being possible to hold the carbon shoes with forces which remain constant in the longitudinal direction, in a manner which is simpler than in the known case, which, as a result of the specific brittleness of the carbon shoe, is better than retention of the same with forces which act differently in the longitudinal direction. In addition, the electrical contact resistance from the carbon shoe to the holder is then constant and smaller over the entire shoe.

It should be mentioned that it is already known for carbon shoes to be held with forces which act continuously in the longitudinal direction. Thus, it is known (AT-PS 209,376) for rubber strips to be provided between the first webs and the carbon shoe. The surfaces separated by the rubber strips do not contribute to making electrical contact. The rubber strips are subject to severe ageing effects. In addition, it is possible to transmit and produce only limited forces using these rubber strips. Furthermore, it is known (AT-PS 342,117 and DE-OS 2,138,459) for the holder itself to be constructed in a sprung manner in specific regions in order to produce the retention forces for the carbon shoe. For this reason, it is not possible to take optimal account of all situations in this way, as in the case of the solution according to the invention in which the holder and spring system are separate from one another.

A development of the invention is for the spring to form an open figure in the transverse direction of the shoe, which figure is curved on one side, has two mutually opposite edges, grips the second webs and presses them against one another. In the case of shoes which are bent transversely with respect to the contact wire, the spring is additionally provided with the radius of the holder. However, it is also possible for the spring to be provided with transverse slots which end shortly in front of the edges.

At the ends, the spring may have holes into which hooks can be inserted, by means of which the springs can be pulled out of the shoe.

Another possibility is for the spring to be a leaf spring which is slightly curved in the transverse direction of the shoe, is arranged between the second webs and presses the latter apart.

It is furthermore possible for the spring to form a closed figure in the transverse direction of the shoe, which figure is curved on one side, is arranged between the second webs and presses the latter apart.

The spring of this type can be hollow inside, but it can also be solid internally and be composed of strongly elastic material.

If the spring is hollow, then the spring wall could be constructed elastically, there being compressed gas, especially compressed air, in its interior in a controlled manner.

It is naturally expedient if the springs as claimed in claims 1 to 7 are composed of spring steel.

It is furthermore proposed that the first webs be connected to one another via a wall which is arranged underneath the second webs. The holder without a spring is then integral. If the first webs are not connected to a wall, then the holder without a spring comprises two halves.

An alternative to the second webs which extend over the entire holder length is for said webs to be short pieces in the longitudinal direction, which short pieces are connected to the first webs on the right and left alternately and interlock. In this case, the holder without a spring comprises two parts. If the first webs are connected to a wall underneath the second webs, then the holder is integral.

It is thus expedient if the second webs have laterally projecting shoulders at their free ends, behind which shoulders the spring engages.

It is furthermore proposed that, in the longitudinal direction of the shoe, the spring comprises a plurality of pieces which are adjacent to one another, with or without a space. This construction is particularly interesting if the shoe is bent transversely with respect to the contact wire.

A further construction of the invention is for a sensing element, which records the mechanical oscillations of the shoe, to be located on the holder. This sensing element is connected to an indicating apparatus. In this way is it possible to detect defects of the most varied type, for example defects of the carbon shoe, such as delaminations in the region of the sliding surface of the carbon shoe, or shoe fractures, as well as defects in the contact wire. If everything is serviceable, the indicating apparatus indicates a specific mechanical behavior of the sensing element and hence of the shoe. Defects of the said type lead to deviations from this indication.

If the first webs are connected to one another via a wall which is arranged underneath the second webs, then it is expedient to arrange the sensing element in the space above this wall.

It is furthermore expedient to provide two springs, between which the sensing element is located.

BRIEF DESCRIPTION OF THE DRAWINGS

Further details of the invention result from the drawings, in which:

FIG. 2 shows a view of the first embodiment from underneath, without a spring, FIG. 2A illustrates the embodiment of the invention shown by FIG. 2 in which the spring is formed from a plurality of adjacent pieces.

DESCRIPTION OF THE PREFERRED EMBODIMENTS OF THE INVENTION

Figure 1:
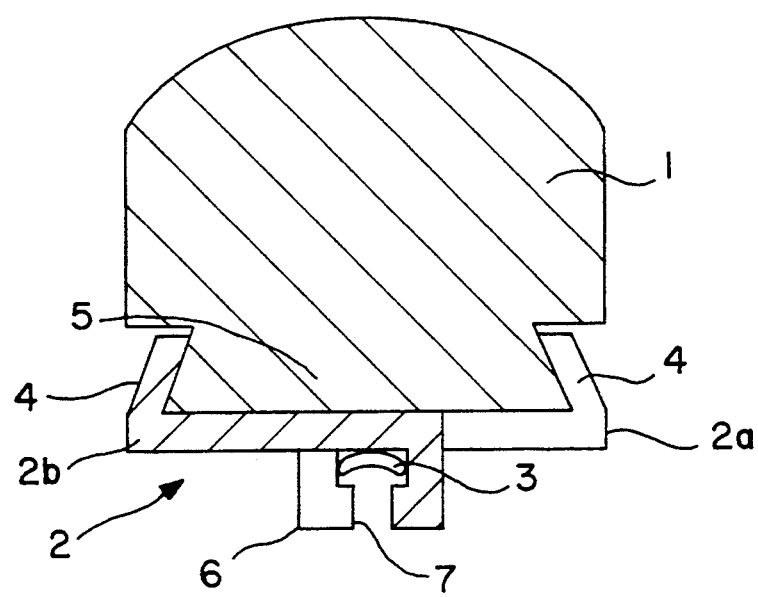
FIG. 1 shows a section through a first embodiment of the invention, in accordance with the line I—I in FIG. 2.
Figure 1A:
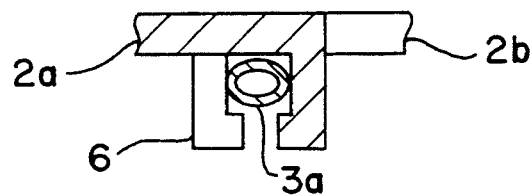
FIG. 1a illustrates a variation of the embodiment of FIG. 1 in which the spring is in a closed configuration.

In FIGS. 1 and 2, 1 designates a carbon shoe, 2 a holder for said carbon shoe, comprising the parts 2a and 2b, and 3 a leaf spring. The holder has first webs 4 which grip a foot region 5 of the carbon shoe. Furthermore, the holder has two webs 6 which have inwardly projecting shoulders 7 at their free ends. Said shoulders 7 are used as retention for the spring 3. The latter is bent slightly in the transverse direction of the shoe and exerts a pressure on the webs 6 which leads to the webs 4 firmly gripping the foot region 5 of the carbon shoe 1. If the spring 3 is pulled out vertically with respect to the plane of the drawing in FIG. 1, then, inter alia, the two parts 2a and 2b are detached from one another. FIG. 1a illustrates an embodiment similar to that of FIG. 1 in which the leaf spring 3 of FIG. 1 is replaced by a closed spring 3A illustrated in FIG. 1a. FIG. 2A illustrates an embodiment of the invention similar to that shown in FIG. 2 except FIG. 2A illustrates that the spring element is formed from a plurality of separate, adjacent pieces 22, 24, 26 and 28.

Figure 3:
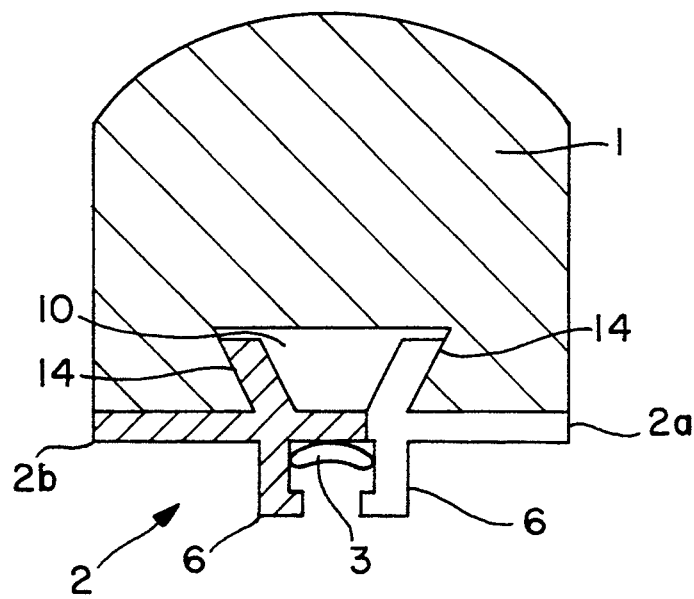
FIG. 3 shows a section through a second embodiment corresponding to FIG. 1.

The embodiment in FIG. 3 differs from the embodiment in FIGS. 1 and 2 essentially in that the carbon shoe 1 has an inwardly expanding section 10 in the central region, into which first webs 14 engage. Otherwise, this embodiment corresponds to the embodiment in FIGS. 1 and 2.

Figure 4:
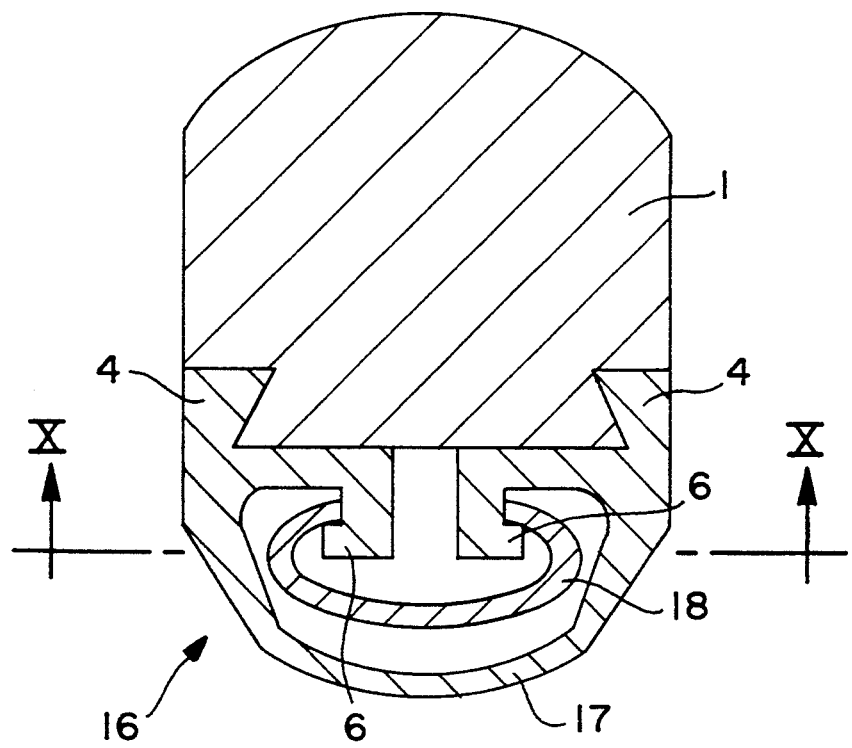
FIG. 4 shows a section through a third embodiment of the invention corresponding to FIG. 1.

In the case of the embodiment in FIG. 4, the holder 16 is integral. It has first webs 4 and second webs 6. Otherwise, a wall 17 is provided which connects the webs 4 to one another, runs underneath the webs 6 and forms a space in which the webs 6 and a spring 18 are located. Said spring 18 is bent transversely with respect to the longitudinal direction of the shoe and presses the second webs 6 against one another. In this way, the first webs 4 are also pressed against one another. To this extent, they hold the carbon shoe 1 firmly.

Figure 4A:
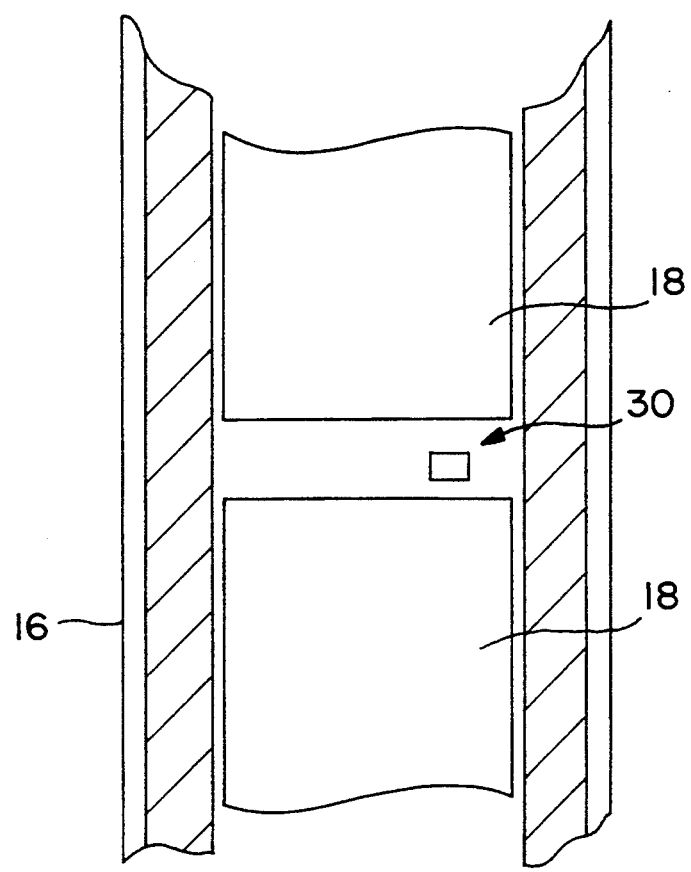
FIG. 4A shows a section through the embodiment of the invention illustrated by FIG. 4, taken along directional lines X—X, illustrating a sensing element.

A sensing element 30 (shown in FIG. 4A) can be located in the space above the wall 17, which sensing element detects the mechanical behavior of the shoe (oscillations, shocks etc.). In this way, it is possible to test various aspects: during normal operation, the holder will execute a specific oscillation. A deviation from this oscillation occurs when, for example, the carbon shoe has defects such as cracks, delaminations or fractures. Defects in the overhead line and, to a certain extent, problems in the track bed, can also be proven.

Figure 5:
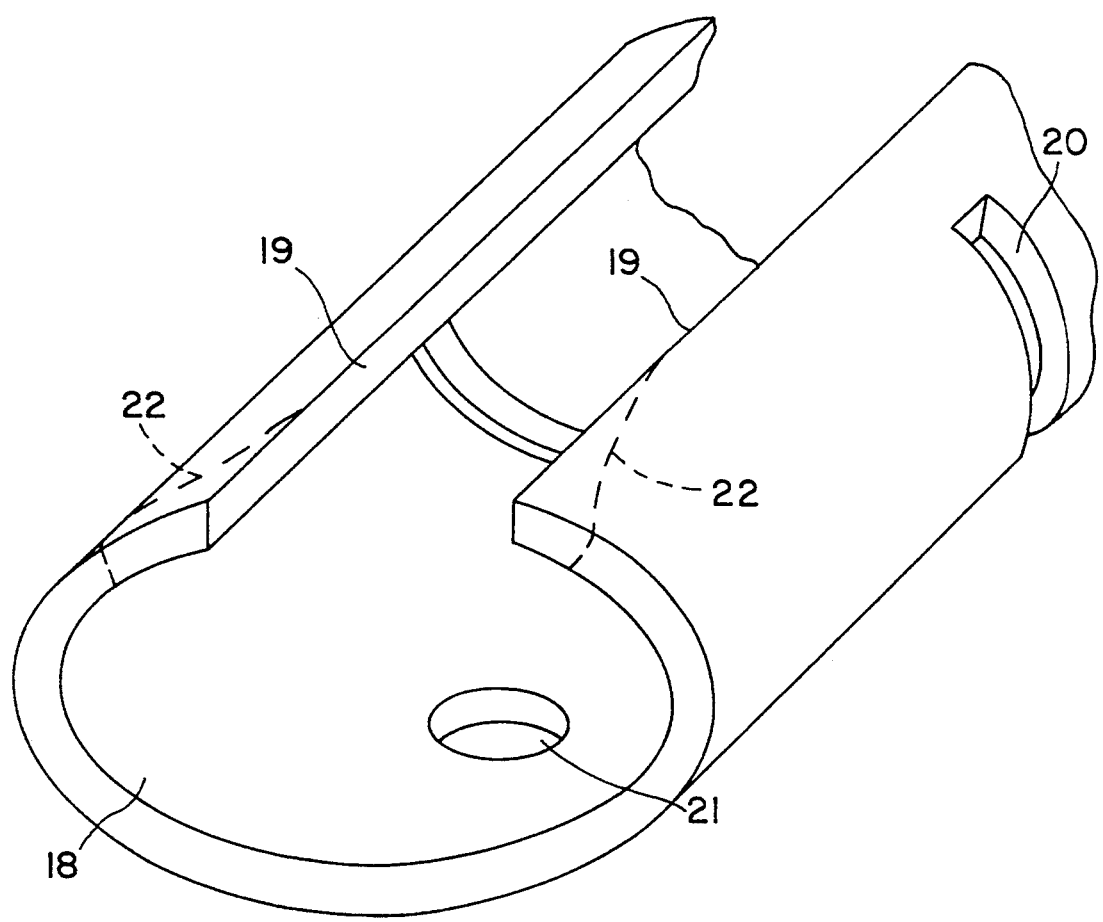
FIG. 5 shows a perspective view of a spring.

FIG. 5 shows a bent spring 18 with opposite edges 19. The spring is provided with transverse slots 20. A hole 21 is located at the end of the spring 18. A hook can be engaged in said hole 21 and the spring can then be pulled out. Two dashed lines 22 indicate an alternative: the edges could be formed in such a manner for the purpose of pushing the spring on more easily.

Figure 6:
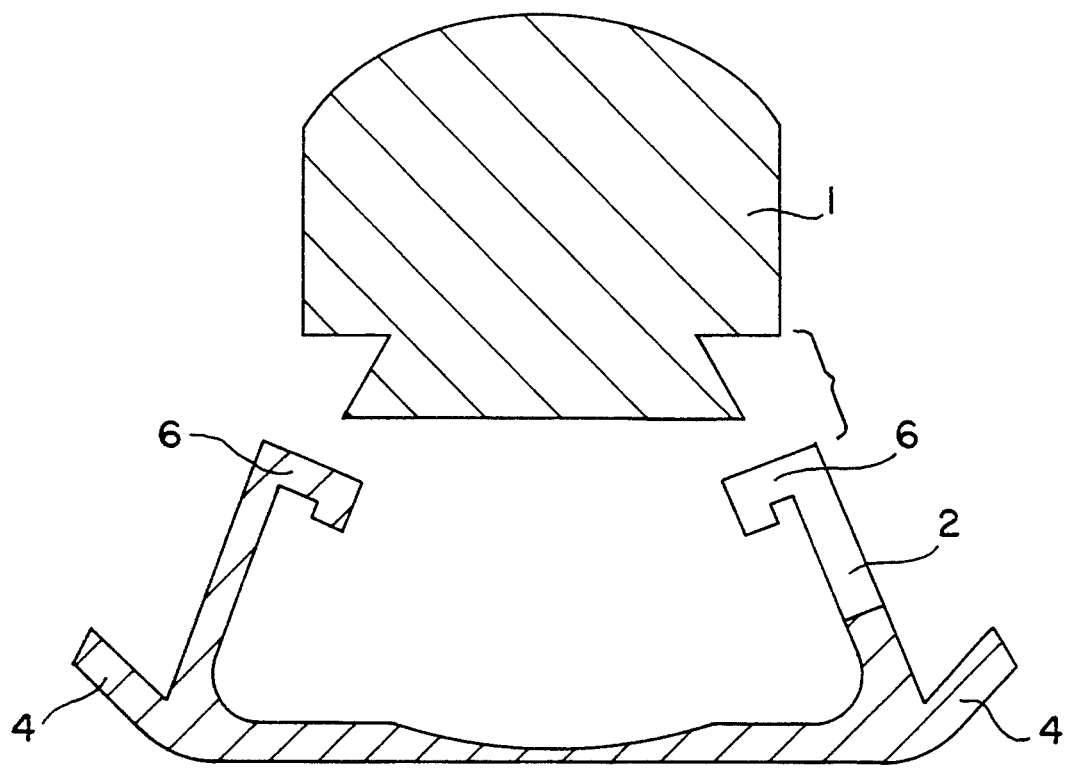
FIG. 6 shows a further embodiment before assembly, and FIG. 7 after assembly.
Figure 7:
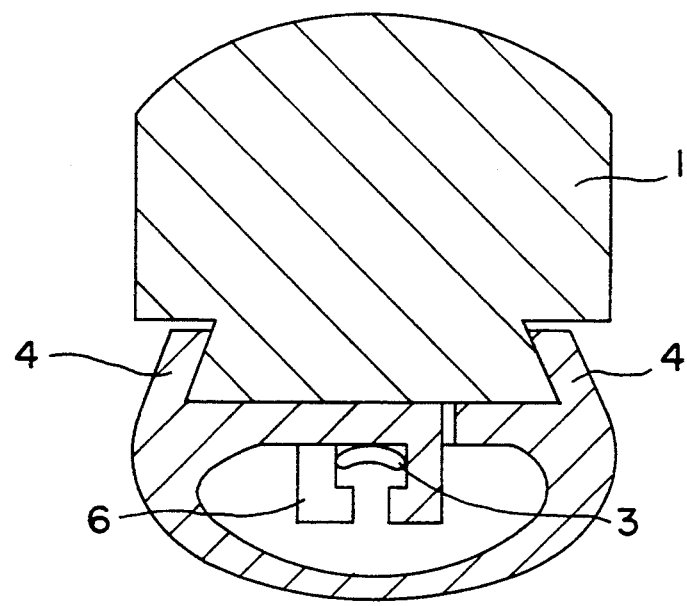

FIGS. 6 and 7 show an embodiment before and after assembly. The holder is composed of, for example, aluminum.

The parts, namely the holder and the carbon shoe, can, naturally, also be bonded or soldered to one another.

Figure 8:
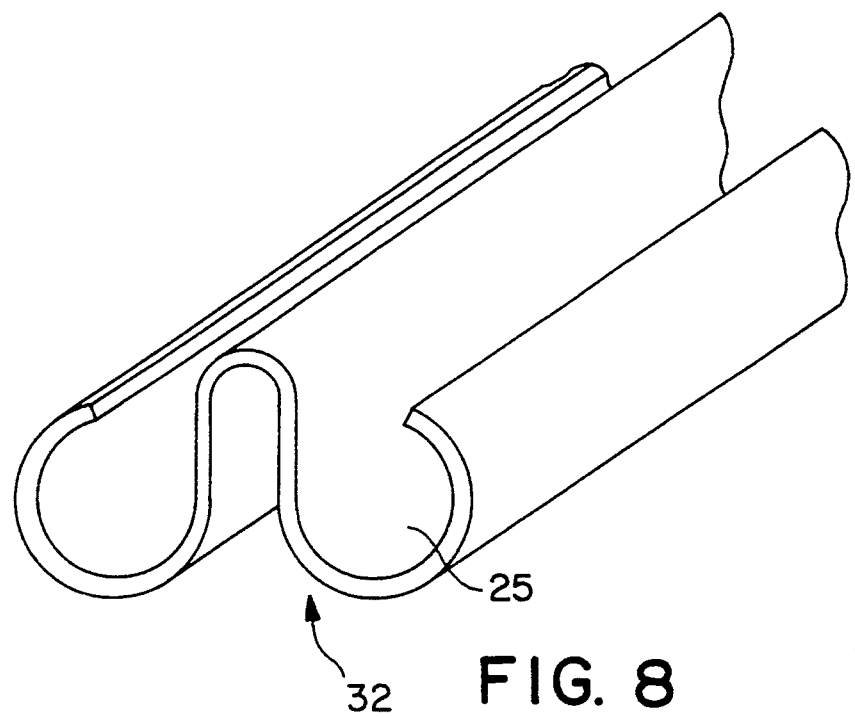
FIG. 8 and FIG. 8A illustrate, respectively, a spring having an upwardly projecting bulge illustrated in perspective, and a sectional view of a device in accordance with the present invention in which said spring having said upwardly projecting bulge is in an operative position in which the bulge presses a contact strip inserted between a carbon shoe and a holder against the carbon shoe.
Figure 8A:
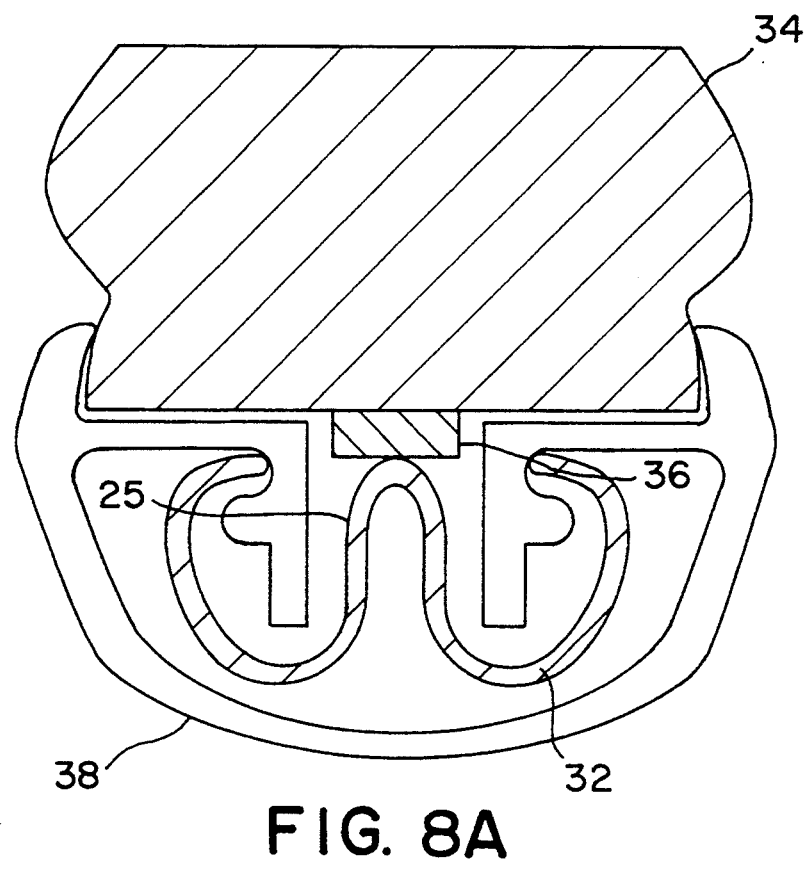

A further embodiment of the invention (See FIGS. 8 and 9) is for the spring 22, apart from its central region, to form an open figure in the transverse direction of the shoe, which figure is curved on one side, has mutually opposite edges, grips the second webs and presses them against one another and, in its central region, for the spring to have an upwardly projecting bulge 25, which presses a contact strip 36, which is inserted between the carbon shoe 34 and the

I claim:

1. A current collector holder for a carbon shoe, which bears against a contact wire, for electrically driven vehicles, which holder has two first webs, which project away from the shoe and are arranged underneath said shoe, a spring system separable from said holder being provided which presses each of the second webs relative to one another for pressing the first webs against the foot region of the shoe, wherein a spring is provided as the spring system, which spring extends uniformly in a longitudinal direction of the shoe, bears with its longitudinal region against the second webs, and in this way transmits its spring force, which acts in a direction transverse to the shoe, to the second webs for exerting forces continuously over the length of said shoe.

2. The holder as claimed in claim 1, wherein the spring forms an open figure in the transverse direction of the shoe, which figure is curved in one direction, has two mutually opposite edges, grips the second webs and presses them against one another.

3. The holder as claimed in claim 2, wherein the spring has transverse slots which end shortly in front of the edges.

4. The holder as claimed in claim 1, wherein the spring has holes at its ends.

5. The holder as claimed in claim 1, wherein the spring is a leaf spring which is slightly curved in a direction transverse to the shoe, and said spring is arranged between the second webs and exerts a force thereon for pressing said second webs in a relative direction apart from each other.

6. The holder as claimed in claim 5, wherein the second webs are short pieces in the longitudinal direction, which short pieces are connected to the first webs on the right and left alternately and interlock.

7. The holder as claimed in claim 1, wherein the spring forms a closed figure, in the transverse direction of the shoe, which figure is curved in one direction, is arranged between the second webs and presses the latter apart.

8. The holder as claimed in claim 7, wherein the spring is hollow.

9. The holder as claimed in claim 8, wherein an outer wall of the spring is elastic, and said holder comprising means for introducing compressed gas in a controlled manner into said spring.

10. The holder as claimed in claim 7, wherein the spring is solid internally and is composed of relatively strongly elastic material.

11. The holder as claimed in claim 7, wherein the second webs are short pieces in the longitudinal direction, which short pieces are connected to the first webs on the right and left alternately and interlock.

12. The holder as claimed in claim 1, wherein the spring is composed of spring steel.

13. The holder as claimed in claim 1, wherein the first webs are connected to one another via a wall, which is arranged underneath the second webs.

14. The holder as claimed in claim 13, wherein a sensing element which records the mechanical oscillations of the holder is located in the space above the wall.

15. The holder as claimed in claim 14, wherein two springs are provided, between which the sensing element is located.

16. The holder as claimed in claim 1, wherein the second webs have laterally projecting shoulders at their free ends, behind which shoulders the spring engages.

17. The holder as claimed in claim 1, wherein, in the longitudinal direction of the shoe, the spring comprises a plurality of pieces which are adjacent to one another.

18. The holder as claimed in claim 1, wherein a sensing element which records the mechanical oscillations of the holder is located thereon.

19. The holder as claimed in claim 1, wherein, apart from its central region, the spring forms an open figure in the transverse direction of the shoe, which figure is curved in one direction, has mutually opposite edges, grips the second webs and presses them against one another, and wherein, in its central region, the spring has an upwardly projecting bulge which presses a contract strip, which is inserted between the carbon shoe and the holder, against the carbon shoe.

* * * * *